United States Patent
Shoemaker

(10) Patent No.: US 7,134,002 B2
(45) Date of Patent: Nov. 7, 2006

(54) APPARATUS AND METHOD FOR SWITCHING THREADS IN MULTI-THREADING PROCESSORS

(75) Inventor: Ken Shoemaker, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 09/942,812

(22) Filed: Aug. 29, 2001

(65) Prior Publication Data
US 2003/0046521 A1    Mar. 6, 2003

(51) Int. Cl.
*G06F 9/48* (2006.01)
(52) U.S. Cl. .................. 712/228; 712/229; 712/43; 712/215
(58) Field of Classification Search ............... 712/215, 712/228, 229, 43
See application file for complete search history.

(56) References Cited

OTHER PUBLICATIONS

Eggers, Susan, et al., Simultaneous Multithreading: A Platform for Next-Generation Processors, Sep./Oct. 1997, IEEE Micro, pp. 12-19.*
Ungerer, et al., Multithreaded processors, 2002, British Computer Society, The Computer Journal, vol. 45, No. 3, pp. 320-348.*
Oehring, H.; Sigmund, U.; Ungerer, T., "MPEG-2 video decompression on simultaneous multithreaded multimedia processors," Parallel Architectures and Compilation Techniques, 1999, IEEE Proceedings, pp. 11-16.*

* cited by examiner

*Primary Examiner*—Fritz Fleming
*Assistant Examiner*—Tonia L. Meonske
(74) *Attorney, Agent, or Firm*—Paul E. Steiner

(57) ABSTRACT

An multi-threading processor is provided. The multi-threading processor includes a first instruction fetch unit and a second instruction fetch unit. A multi-thread scheduler unit is coupled to the first instruction fetch unit and the second instruction fetch unit. An execution unit, which executes a first active thread and a second active thread is coupled to the scheduler unit. The multi-threading processor also includes a register file coupled to the execution unit. The register file switches one of the first active thread and the second active threads with a first inactive thread.

8 Claims, 5 Drawing Sheets

APPARATUS AND METHOD FOR SWITCHING THREADS IN MULTI-THREADING PROCESSORS

BACKGROUND OF THE INVENTION

1. Field of the Invention

The present invention relates generally to increasing utilization and overall performance in multi-threading microprocessors. More particularly, the present invention relates to reducing idle time in simultaneous multi-threading processors with minimal circuit impact and minimal machine cost.

2. Description of the Related Art

In a conventional computer system, microprocessors run several processes. The computer system utilizes an operating system (OS) to direct the microprocessor to run each of the processes based on priority and on the process not waiting on an event (e.g., a disk access or a user keypress) to continue. A simple type of priority system simply directs the OS to run the programs in sequence (i.e., the last program to be run has the lowest priority). In other systems, the priority of a program may be assigned based on other factors, such as the importance of the program, how efficient it is to run the program, or both. Through priority, the OS is then able to determine the order in which programs or software threads or contexts are executed by the processor. It takes a significant amount of time, typically more than several hundred instructions, for the OS to switch from one running process to another running process.

Because of the process switching overhead, the OS will only switch out a process when it knows the process will not be running again for a significant amount of time. However, with the increasing speed of processors, there are events, which make the process unexecutable for a certain amount of time not long enough to justify an OS-level process switch. When the program is stalled by such an event, such as a cache miss (e.g., when a long latency memory access is required), the processor experiences idle cycles for the duration of the stalling event, decreasing the overall system performance. Because newer and faster processors are always being developed, the number of idle cycles experienced by processors is also increasing. Although memory access speed is also being improved, it does not improve at the same rate as microprocessor speeds, therefore, processors are spending an increasing percentage of time waiting for memory to respond.

Recent developments in processor design have allowed for multi-threading, where two or more distinct threads are able to make use of available processor resources. Two particular forms of multi-threading are Switch on Event Multi-Threading (SoEMT) and Simultaneous Multi-Threading (SMT), each of which have advantages and disadvantages by comparison. In SoEMT, if a first thread is stalled by an event, the processor (not the OS) may switch the execution context to a second thread to avoid idle cycles. In SMT, two threads are able to run in parallel, a feature that is particularly useful in wide processors, which have the bandwidth to execute additional operations at the same time.

Figures 1A, 1B:
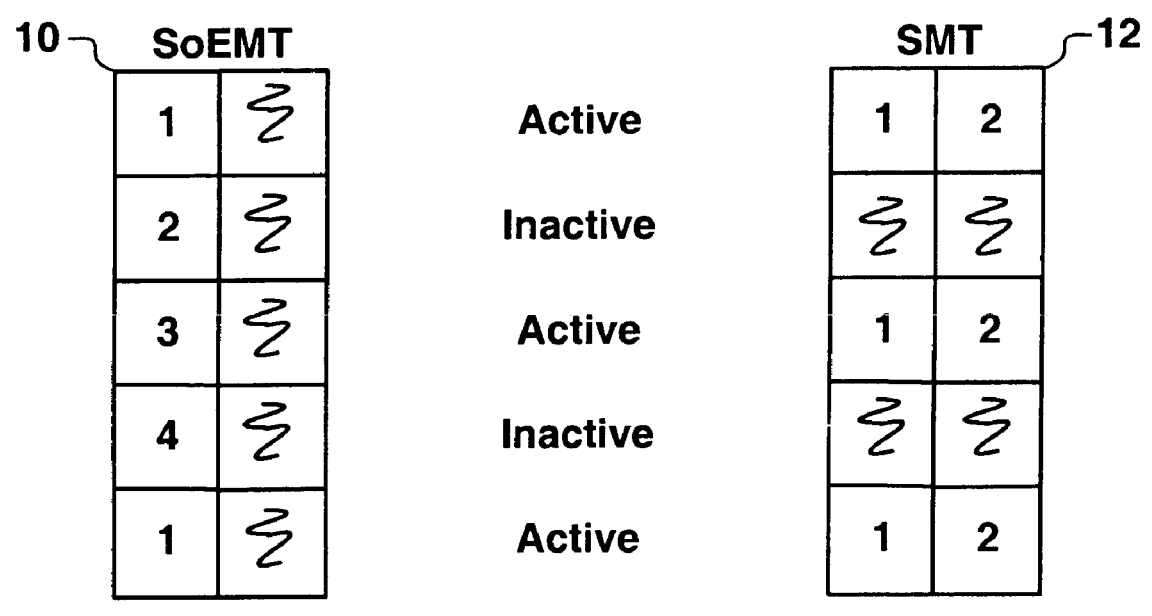

FIG. 1A is a simplified diagram of the two threads in a SoEMT system 10 operating in a wide processor. In SoEMT system 10, only one thread (indicated by numbers 1 and 2) may be active at a given time. If thread 1 encounters a stalling event such as a cache miss, SoEMT system 10 switches control to thread 2, which was inactive before switching. Thread 2 may have control over the processor until another stalling event occurs or until a certain amount of time has elapsed, upon which the processor may switch back to execute the original thread or execute a different thread.

While the ability to switch the processor between threads increases processor utilization, SoEMT system 10 is not able to take advantage of the additional bandwidth in a wide processor because only one thread may be active at a time. Therefore, even in the most optimal scenario, SoEMT system 10 is like any single threaded machine and able to utilize only half of the wide processor bandwidth. However, SoEMT systems remain very useful because they decrease the number of idle cycles experienced by the processor whenever there is a cache miss.

FIG. 1B is a simplified diagram of a two threaded SMT system 12 operating in a wide processor. In the SMT system, multiple threads are able to issue instructions during each cycle. Unlike SoEMT, where only a single thread is active on a given cycle, SMT permits multiple threads to compete for and share processor resources at the same time. The threads are scheduled concurrently and therefore operations from both threads progress down the pipeline simultaneously. The result is a dramatic increase in system performance, including higher instruction throughput and program acceleration in both multi-programmed and parallel environments.

Unfortunately, the SMT systems have a much larger machine cost and require more machine resources than a SoEMT system. Furthermore, the effectiveness of SMT decreases as the number of threads increases because the underlying machine resources are limited and because of the exponential cost increase of inspecting each additional thread. SMT systems are also vulnerable to being disrupted by the same stalling events that plague single threaded machines. Therefore, when a stalling event occurs in a SMT thread, the processor will experience idle cycles while the long latency operation occurs. As shown in FIG. 1B, if both threads 1 and 2 experience cache misses at the same time, the entire processor will be stalled because there are no other threads to switch in.

In view of the foregoing, it is desirable to have a method and apparatus that provides for a system able to maximize the use of wide processor resources. This may be accomplished by providing a multi-threading system that is able to execute two threads simultaneously and switch processor resources to execute an inactive thread when an active thread encounters a stalling event. It is also desirable to accomplish this goal with minimal circuit impact and minimal additional overhead.

BRIEF DESCRIPTION OF THE DRAWINGS

The present invention will be readily understood by the following detailed description in conjunction with the accompanying drawings. To facilitate this description, like reference numerals designate like structural elements.

FIG. 1A is a simplified diagram of the two threads in a SoEMT system operating in a wide processor.

FIG. 1B is a simplified diagram of a two threaded SMT system operating in a wide processor.

DETAILED DESCRIPTION

A method and apparatus for switching threads in a simultaneous multi-threading computer system to optimize the utilization of a wide processor is provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 2:
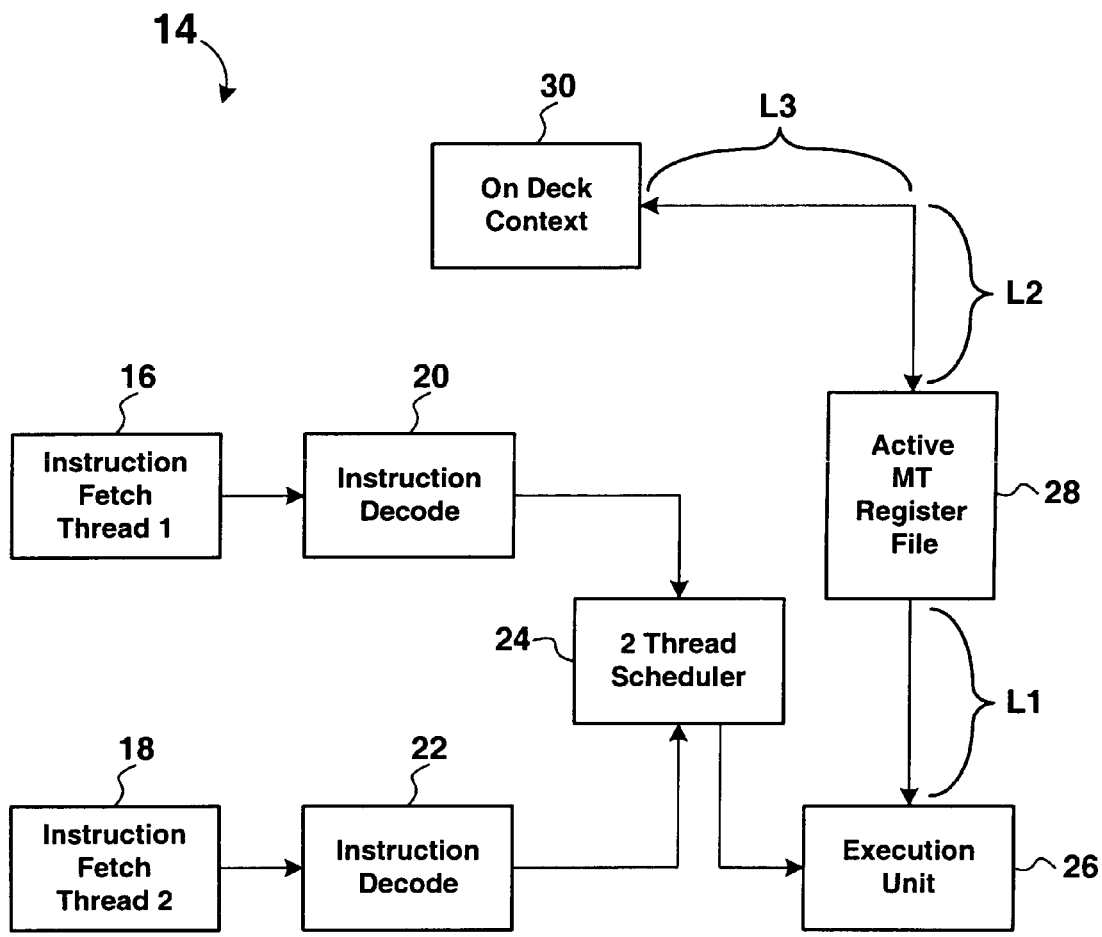
FIG. 2 illustrates a multithreading system in accordance with one embodiment of the present invention.

FIG. 2 illustrates a two-thread, simultaneous and switch on event multi-threading system 14 in accordance with one embodiment of the present invention. Multi-threading system 14 includes a pair of instruction fetch units 16 and 18 for thread 1 and thread 2, respectively. Each of the instruction fetch units (IFU) 16 and 18 are uni-directionally coupled to corresponding instruction decode units (IDU) 20 and 22 for threads 1 and 2. IDUs 20 and 22 are then coupled to two-thread scheduler 24. Multi-threading system 14 also includes an execution unit 26, which is coupled to two-thread scheduler 24 and a two way register file 28. Two way register file 28 is bi-directionally coupled to an on deck context unit 30.

In multi-threading system 14, IFUs 16 and 18 read instructions from memory (such as an instruction cache) for threads 1 and 2. Each IFU functions to ensure that the processor has enough bandwidth to sustain the highest possible instruction issue rate. IFUs also operate to predict future instruction sequences with a high degree of accuracy. The instructions are then transmitted to IDUs 20 and 22, which perform operations such as register renaming and initial dependency checks. IDUs also function to predict branch paths and compute target addresses for branch instructions.

Instructions from IDU 20 and 22 are then transmitted to two-thread scheduler 24. Two-thread scheduler 24 takes into account the available local capacity and prioritizes the incoming instructions from both thread 1 and thread 2, with the goal of maximizing processor utilization. While two-thread scheduler 24 is programmed to schedule only two threads for processing, it is well known in the art that a multi-thread scheduler may be configured to schedule additional threads.

Each additional thread being scheduled would also require a corresponding instruction fetch and instruction decode unit. While such a system would be able to process more than two threads simultaneously, each additional thread requires an exponential increase in machine cost, such as a large parallel logic array (PLA), to coordinate and schedule all of the threads. Therefore, it is often not an efficient use of processing power to execute more than two threads at the same time. Furthermore, such additional overhead is often completely unwarranted because few machines have the resources to support more than two active threads.

Multi-threading system 14 also includes two way register file 28, which is coupled to on deck context 30. Two way register file 28 organizes and maintains the two active threads being processed by multi-threading system 14, such as thread 1 and thread 2. At the same time, on deck context 30 organizes and maintains inactive threads, which in this example are threads 3 and 4. If either of the active threads 1 or 2 encounters a stalling event, two way register file 28 and on deck context 30 switch an inactive thread in for the stalled thread. For example, if thread 1 experiences a cache miss, either thread 3 or 4, which are presumably not stalled may be switched into the active state in its place. At the same time, IFU 16 is redirected to fetch either thread 3 or 4. Two way register file 28 is typically physically located adjacent to execution unit 26 because of the latency and bandwidth requirements between the active registers and the execution units. However, because the threads in on deck context 30 are inactive, on deck context 30 may be coupled further away from execution unit 26. Finally, after being organized by two-thread scheduler 24, instructions from both threads are completed by execution unit 26.

Figure 3:
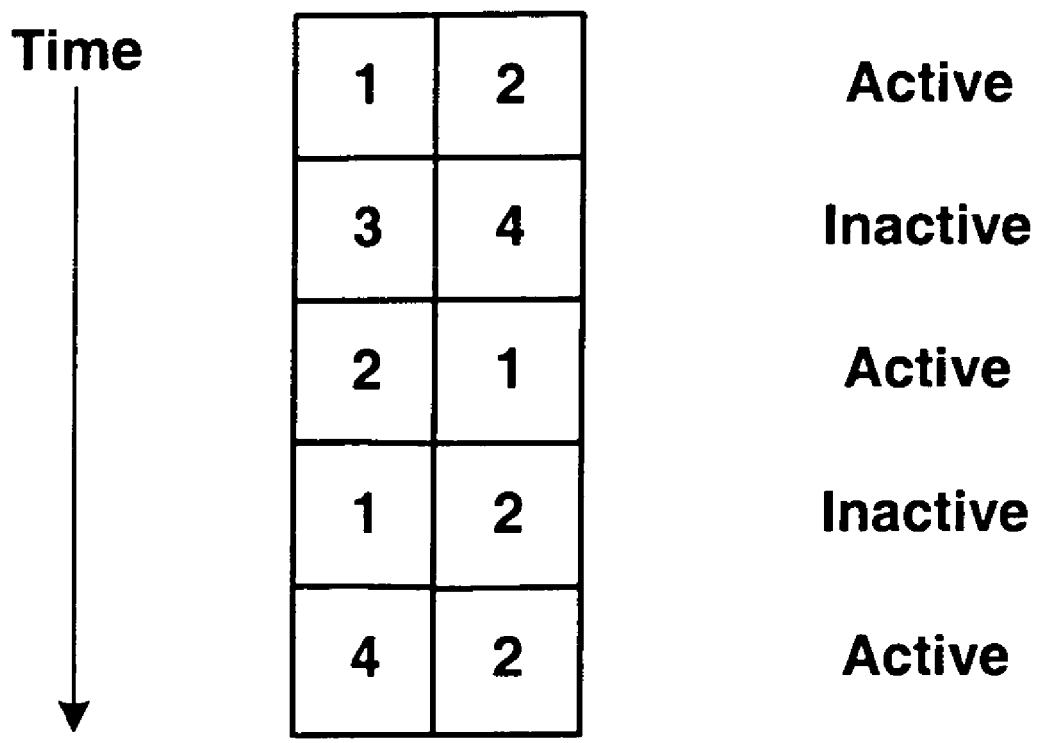
FIG. 3 is a simplified diagram of the two threads of multi-threading system operating in a wide processor in accordance with one embodiment of the present invention.

FIG. 3 is a simplified diagram of the four threads of multi-threading system 14 operating in a wide, superscaler processor in accordance with one embodiment of the present invention. In multi-threading system 14, both threads 1 and 2 are active at the same time. If thread 1 encounters a stalling event, then it may be switched with either thread 3 or 4 so that the processor does not idle during the stalling event. If thread 2 encounters a stalling event, it may also be switched with either thread 3 or thread 4. As illustrated by FIG. 3, multithreading system 14 is very flexible in dealing with stalled threads. If for example, threads 3 or 4 encounter a stalling event, then threads 1 and 2 may be switched back into the active state, presuming that they are ready to be executed again.

Figure 4:
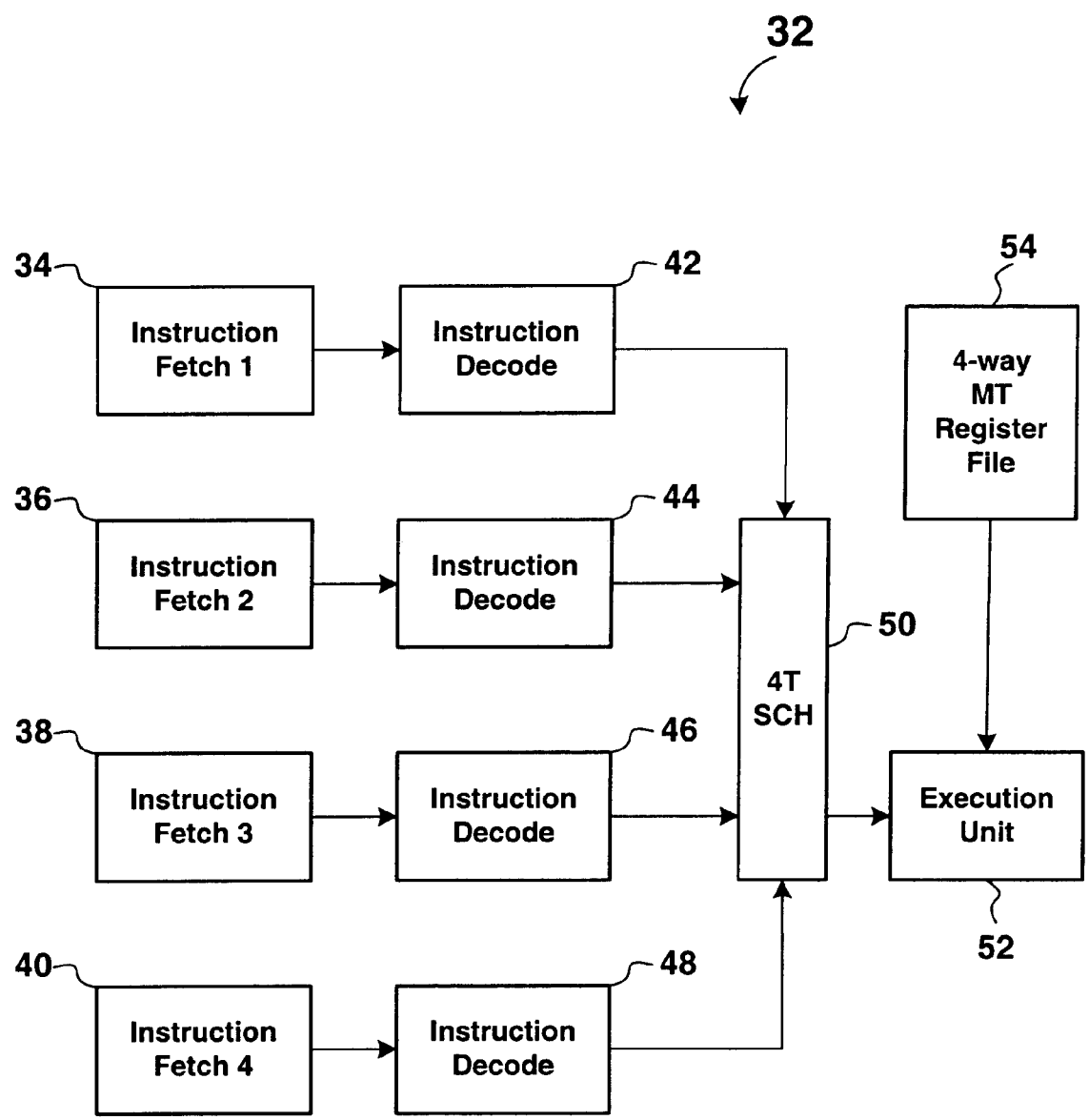
FIG. 4 illustrates a multi-threading system in accordance with another embodiment of the present invention.

FIG. 4 illustrates a four thread simultaneous, switch on event multi-threading system 32 in accordance with another embodiment of the present invention. Multi-threading system 32 includes four IFUs 34, 36, 38, and 40 for threads 1, 2, 3, and 4, respectively. Each of IFUs 34, 36, 38, and 40 are uni-directionally coupled to corresponding IDUs 42, 44, 46, and 48, which are then coupled to four thread scheduler 50. Multi-threading system 14 also includes an execution unit 52, which is coupled to four thread scheduler 50 and a four way register file 54.

As described above with regard to FIG. 2, IFUs 34, 36, 38, and 40 read instructions from memory for threads 1, 2, 3, and 4 in multi-threading system 32. The instructions are then transmitted to IDUs 42, 44, 46, and 48 before being scheduled by four-thread scheduler 50. Multi-threading system 14 also includes four-way register file 54, which organizes and maintains the four threads being processed by multi-threading system 32. Two of the threads are typically active while two threads are inactive. Thus, the 4T scheduler 50 would only look at two threads at any one time. This reduces the complexity and size of this logic, per this invention.

If either of the active threads encounters a stalling event, four way register file 56 and switches an inactive thread in for the stalled thread. For example, if thread 1 experiences a cache miss, either thread 3 or 4, which are presumably not stalled may be switched into the active state in its place by four way register file 54. The active threads are then scheduled by four-thread scheduler 50 and executed by execution unit 52.

Figure 5:
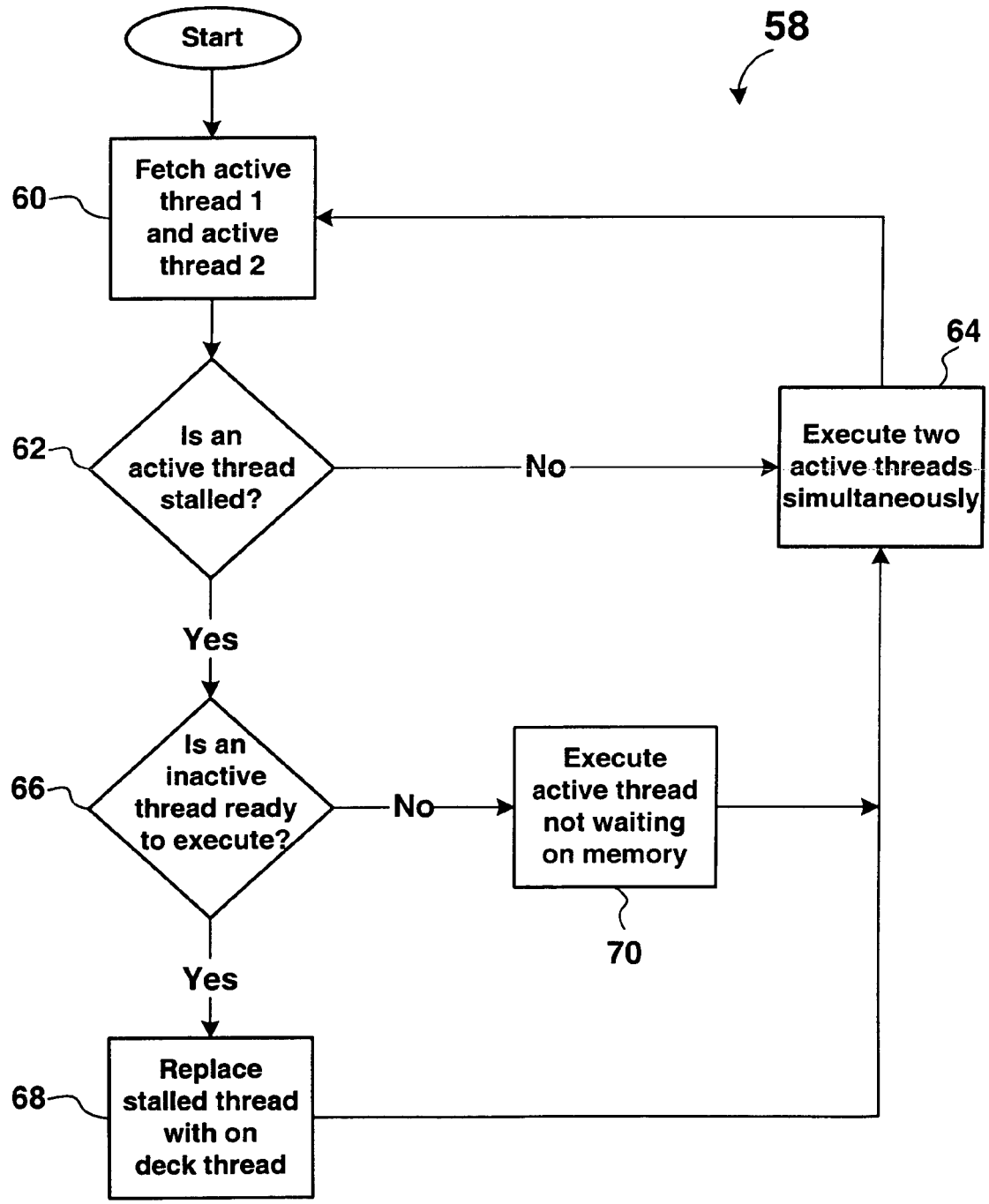
FIG. 5 is a flow chart of a method for switching threads in multi-threading systems in accordance with one embodiment of the present invention.

FIG. 5 is a flow chart of a method 58 for switching threads in multi-threading systems in accordance with one embodiment of the present invention. Method 58 begins at a block 60, where active threads 1 and 2 are fetched. In a block 62, it is determined whether either of the active threads are stalled. If neither thread is stalled, then the processor is operating at maximum efficiency, and the two active threads are executed simultaneously in a block 64. Method 58 then returns to block 60 to fetch the active threads.

If, however, an active thread is stalled, then method 58 determines whether an there is an inactive thread, which is on deck that is ready to execute in a block 66. If there is an inactive thread ready to execute, then block 68 replaces the stalled thread with the inactive thread. After the stalled thread has been replaced, the processor can return to operating at maximum efficiency, and the inactive thread becomes active, giving the processor two active threads to execute simultaneously in a block 64. If there is no inactive thread on deck, then the processor executes the remaining active thread that is not stalled in a block 70. Of course, if all 4 threads are stalled, the processor will be idle. In both blocks 64 and blocks 70, method 58 returns to block 60 to fetch the active threads.

In summary, the present invention provides for a method and apparatus for switching threads in a SMT computer system to optimize processor utilization. The present invention includes a processor having a register file coupled to an execution unit. The register file organizes and maintains the active threads being executed. Because of cost considerations and processor limitations, it is preferable to have only two active threads being processed at a given time. It is also preferred that the execution unit and the register file be located close together so that the execution unit has immediate access to the active threads.

The present invention also includes an on deck context unit, which is coupled to the register file. The on deck context unit organizes and maintains inactive threads, which are ready to be switched to active status should the need arise. When an active thread encounters a stalling event, such as a cache miss requiring a long latency memory access, the register file searches for an inactive thread in the on deck context unit that is ready to be executed. If such a thread is found, it is switched with the stalled thread so that the processor can continue to execute a thread that is not stalled. If there is no inactive thread that is ready to run, the processor continues to execute any other active thread.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A multi-threading processor, comprising:
   a first instruction fetch unit and a second instruction fetch unit;
   a multi-thread scheduler unit coupled to said first instruction fetch unit and said second instruction fetch unit;
   an execution unit coupled to said scheduler unit, wherein said execution unit is to execute a first active thread and a second active thread; and
   a register file coupled to said execution unit, wherein said register file is to switch one of said first active thread and said second active thread with a first inactive thread.

2. A multi-threading processor as recited in claim 1, further comprising an on deck context unit coupled to the register file, wherein said on deck context unit is to maintain the first inactive thread and a second inactive thread.

3. A multi-threading processor as recited in claim 2, wherein said register file is to switch one of the first active thread and the second active thread with the second inactive thread.

4. A multi-threading processor as recited in claim 3, further comprising:
   a first instruction decode unit coupled between the first instruction fetch unit and the scheduler unit; and
   a second instruction decode unit coupled between the second instruction fetch unit and the scheduler unit.

5. A multi-threading processor as recited in claim 1, wherein the scheduler unit is a four thread scheduler unit, further comprising:
   a third instruction fetch unit coupled to said four thread scheduler unit; and
   a fourth instruction fetch unit coupled to said four thread scheduler unit.

6. A multi-threading processor as recited in claim 5, wherein said register file is a four way register file.

7. A multi-threading processor as recited in claim 6, wherein said register file is to switch one of the first active thread and the second active thread with a second inactive thread.

8. A multi-threading processor as recited in claim 7, further comprising:
   a third instruction decode unit coupled between the third instruction fetch unit and the four thread scheduler unit; and
   a fourth instruction decode unit coupled between the fourth instruction fetch unit and the four thread scheduler unit.

* * * * *